US012150589B2

(12) United States Patent
Berge et al.

(10) Patent No.: US 12,150,589 B2
(45) Date of Patent: Nov. 26, 2024

(54) STUFFED WAFFLE TONGS

(71) Applicant: National Presto Industries, Inc., Eau Claire, WI (US)

(72) Inventors: Michael R. Berge, Eau Claire, WI (US); Brent T. Ellis, Altoona, WI (US); Russell W. Hall, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 733 days.

(21) Appl. No.: 17/239,279

(22) Filed: Apr. 23, 2021

(65) Prior Publication Data

US 2021/0235923 A1  Aug. 5, 2021

Related U.S. Application Data

(63) Continuation of application No. 29/702,403, filed on Aug. 19, 2019, now Pat. No. Des. 917,242, and a continuation of application No. 29/702,400, filed on Aug. 19, 2019, now Pat. No. Des. 941,077.

(51) Int. Cl.
*A47J 37/06* (2006.01)
*A21B 5/02* (2006.01)
*A47J 36/16* (2006.01)
*A47J 43/28* (2006.01)

(52) U.S. Cl.
CPC .......... *A47J 37/0611* (2013.01); *A21B 5/023* (2013.01); *A47J 36/16* (2013.01); *A47J 43/283* (2013.01)

(58) Field of Classification Search
CPC ...... A47J 37/0611; A47J 36/16; A47J 43/283; A21B 5/023
USPC ......................................................... 426/497
See application file for complete search history.

(56) References Cited

U.S. PATENT DOCUMENTS

2018/0242783 A1\* 8/2018 Zeutzius .............. A47J 37/0611

\* cited by examiner

*Primary Examiner* — Brent T O'Hern
(74) *Attorney, Agent, or Firm* — Kenneth A. Smith

(57) ABSTRACT

Disclosed is a waffle tong device and a method of using the waffle tong device. The waffle tong device being arranged so that a first and second side of the waffle tong device can be brought together by compressing a spring biased connector and once compressed, the waffle tong device can be placed on a waffle maker, filled with waffle batter and the waffle batter cooked to form a stuffed waffle. The spring biased connector configured such that once the waffle batter is cooked, the waffle tong device can be removed from the waffle maker and allowed to open whereupon the resultant stuffed waffle can be removed from the waffle tong device. Handle portions can be applied to the connector to allow for manipulation of the waffle tong device without risk of burns.

10 Claims, 22 Drawing Sheets

STUFFED WAFFLE TONGS

CROSS REFERENCE TO RELATED APPLICATIONS

This application claims priority to U.S. Design application Ser. No. 29/702,400 filed on Aug. 19, 2019 and U.S. Design application Ser. No. 29/702,403 filed on Aug. 19, 2019 which are incorporated herein by reference in their entirety.

TECHNICAL FIELD

The present invention is directed to the field of stuffed waffle makers. More specifically, the present invention is directed to waffle tongs which provide side walls that function to contain waffle batter during the cooking process and also to allow removal of the stuffed waffle from the upper and lower portion of the waffle maker.

BACKGROUND

Waffle makers have long been known in the art. Typically a waffle maker consists of an upper and lower plate which are pivoted about a hinge such that waffle batter can be poured on the lower plate and the upper plate is pivoted or otherwise moved as to be in contact with the lower plate. The result is that the batter is held between the upper and lower plate for cooking. Waffle makers may be heated by an external heat source to cook the batter or may comprise heating devices that are built into the upper plate, the lower plate, or both. When the upper and lower plate are filled with waffle batter, closed, and heated, the batter hardens into a cake-like waffle. Typically, a waffle comprises indentations or other shapes that serve to retain butter, syrup, or other toppings that are applied before the waffle is consumed. These indentations are formed during the cooking process by raised portions located on the upper and lower plate. While these raised portions may form a typical waffle shape with a number of symmetrical indentations located on the upper and lower surface of the waffle, other shapes may be formed by the plates. Certain waffle makers are adapted to include side plates such that waffles produced by these waffle makers can be formed around a filling (stuffed). An example of such a waffle maker is disclosed in U.S. Pat. Nos. 10,485,239 and 10,687,665 to Michael L. Bradford which are incorporated by reference herein. Known embodiments of such waffle makers require that the side plates be placed manually or connected by a scissor mechanism. Such arrangements may be difficult to operate, easily burn the user, or require an insulated glove to prevent such burns. What is needed is a simple to operate and safe method of positioning and removing the side plates of a stuffed waffle maker.

SUMMARY

Embodiments relate to waffle tongs for use in a stuffed waffle maker. An exemplary embodiment of waffle tongs includes a first side portion, a second side portion, a connecting portion that connects to an inner end of the first side portion, and an inner end of the second side portion, the connecting portion having a flexible midpoint.

In another exemplary embodiment, the connecting portion is formed with a spring bias such that first side portion and the second side portion are held apart from each other when no compressive force is applied to the waffle tong device.

In another exemplary embodiment, the connecting portion comprises a first and second handle portion that together form a gripping surface for applying compressive force to the waffle tong device.

In a further exemplary embodiment, the first and second handle portions are formed from an insulative material such that the handle portions can be gripped without risk of burns.

In yet another exemplary embodiment, the first and second side portions are formed with alignment tabs such that the first and second side portions maintain an alignment such that batter introduced to a space formed by the waffle tong device does not leak out before the batter is cooked.

In another exemplary embodiment, the first and second side portions have raised shapes formed on inner edges of the first and second portions such that a stuffed waffle formed by the waffle maker and the waffle tong device comprises a plurality of indentations formed along a perimeter of the stuffed waffle.

The above summary is not intended to describe each illustrated embodiment or every implementation of the invention. Rather, the exemplary embodiments are chosen and described so as to provide an overview or framework for understanding the nature and character of the claimed aspects and implementations so that those skilled in the art can appreciate and understand the principles and practices of the invention. The Figures and the detailed description that follow more particularly exemplify these exemplary embodiments, and are incorporated in and constitute a part of this specification.

BRIEF DESCRIPTION OF THE DRAWINGS

These and other features and advantages of the present invention will become better understood with regard to the following description and accompanying drawings in which.

Figure 1:
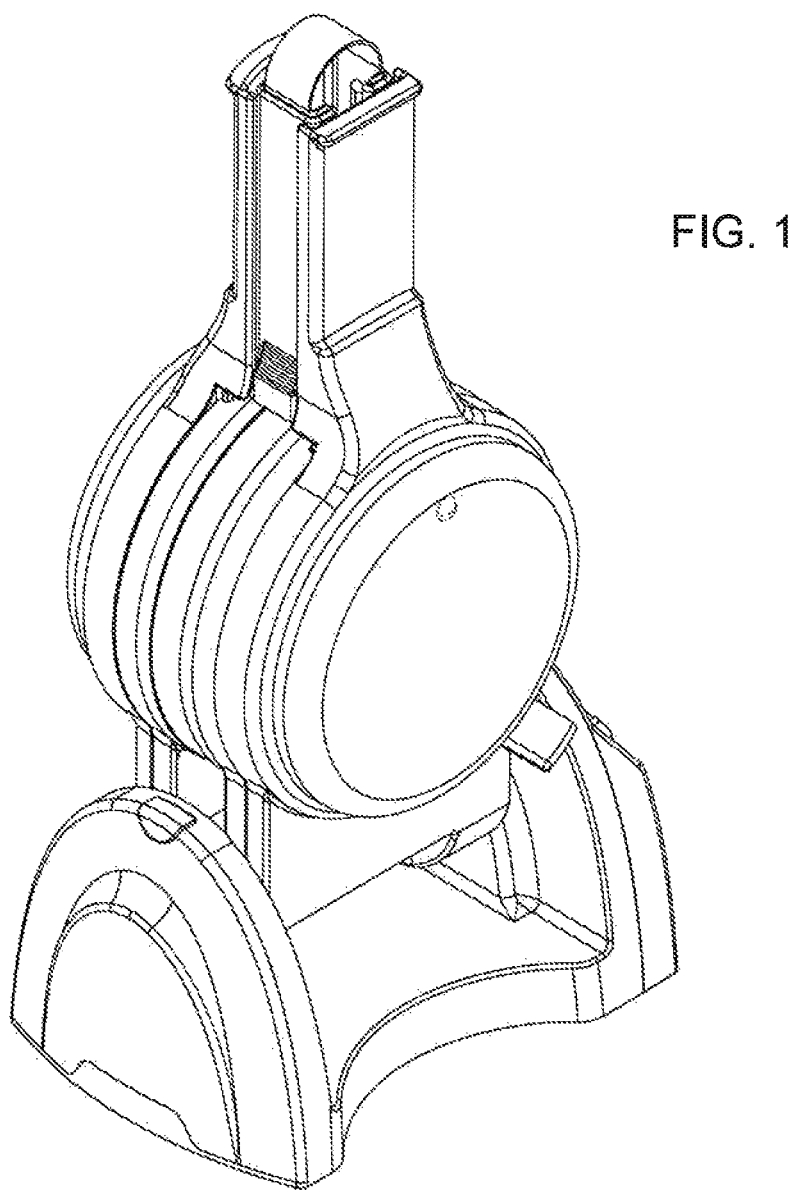
FIG. 1 is a front, right, perspective view of a stuffed waffle maker having waffle tongs according to an exemplary embodiment.
Figure 2:
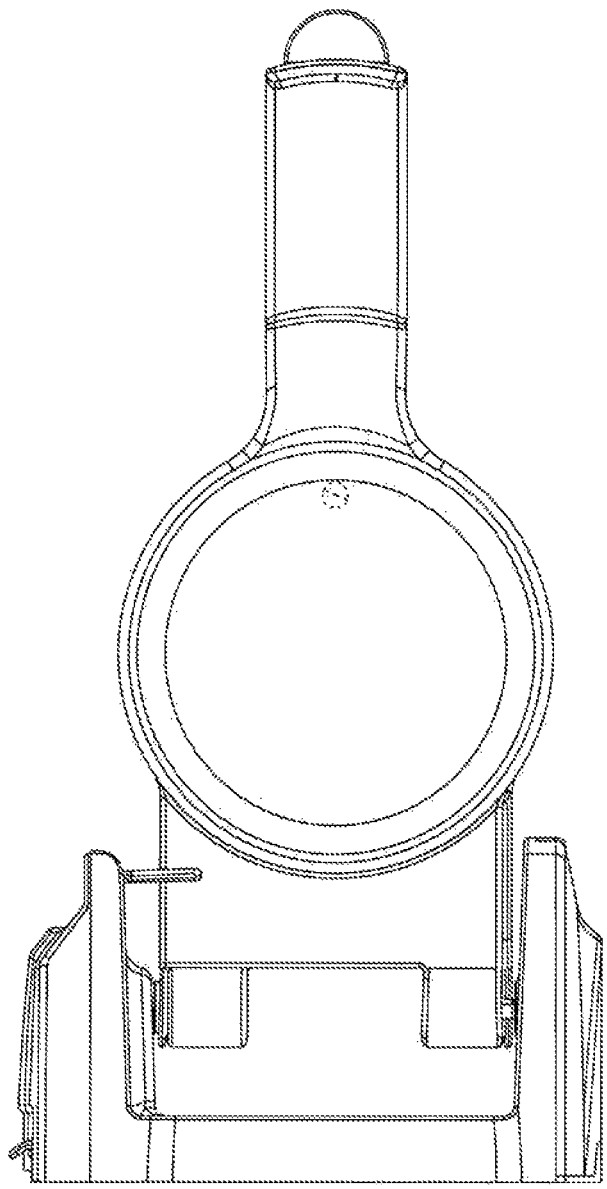
FIG. 2 is a left side view of the stuffed waffle maker depicted in FIG. 1.
Figure 3:
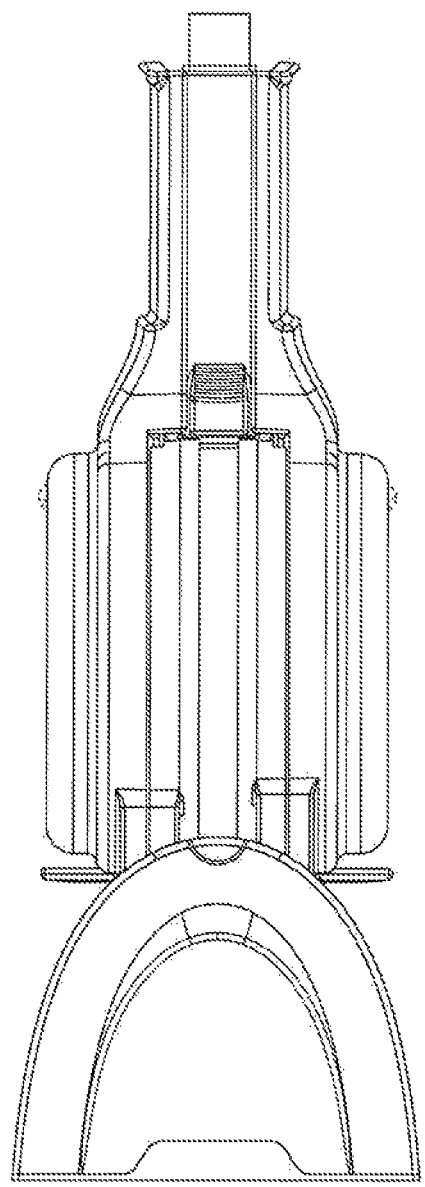
FIG. 3 is a front view of the stuffed waffle maker depicted in FIG. 1.
Figure 4:
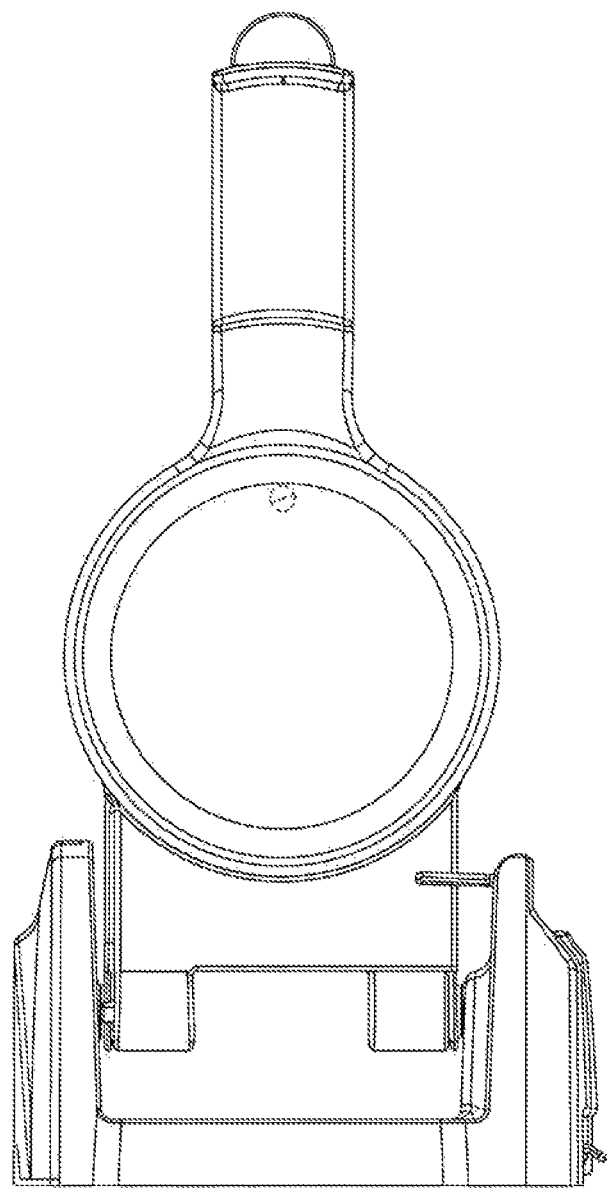
FIG. 4 is a right side view of the stuffed waffle maker depicted in FIG. 1.
Figure 5:
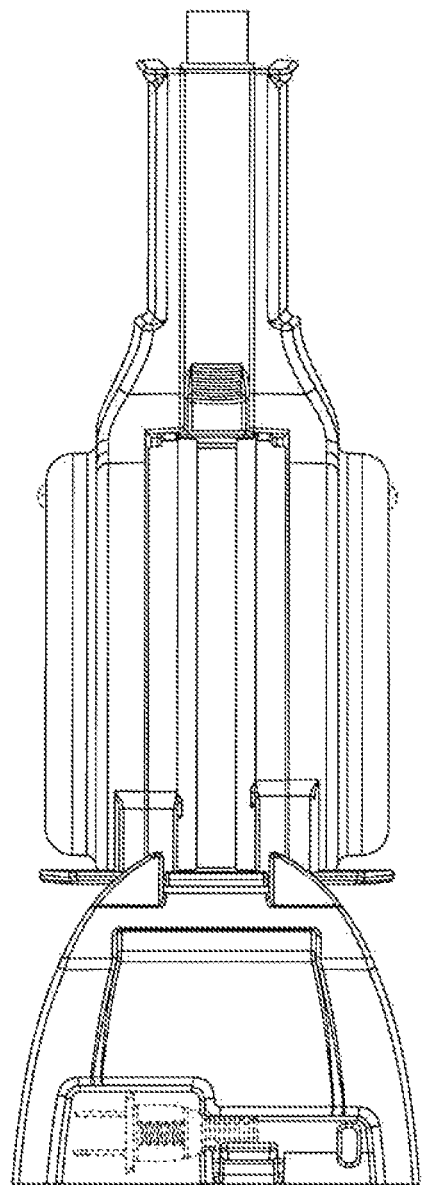
FIG. 5 is a rear view of the stuffed waffle maker depicted in FIG. 1.
Figure 6:
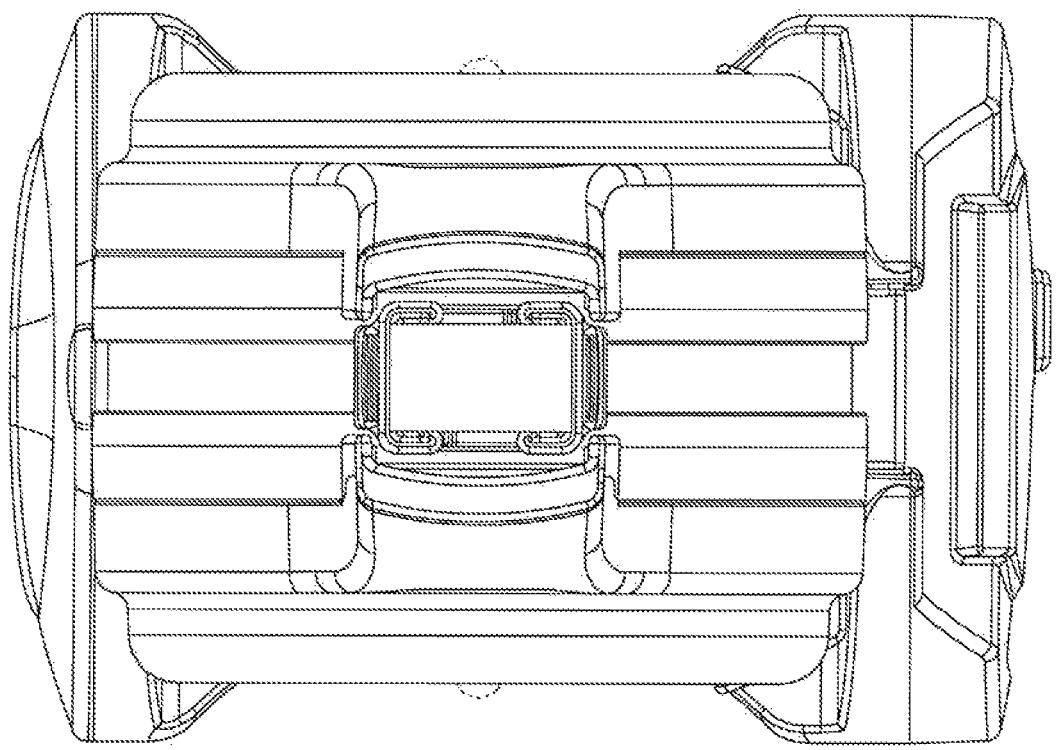
FIG. 6 is a top view of the stuffed waffle maker depicted in FIG. 1.
Figure 7:
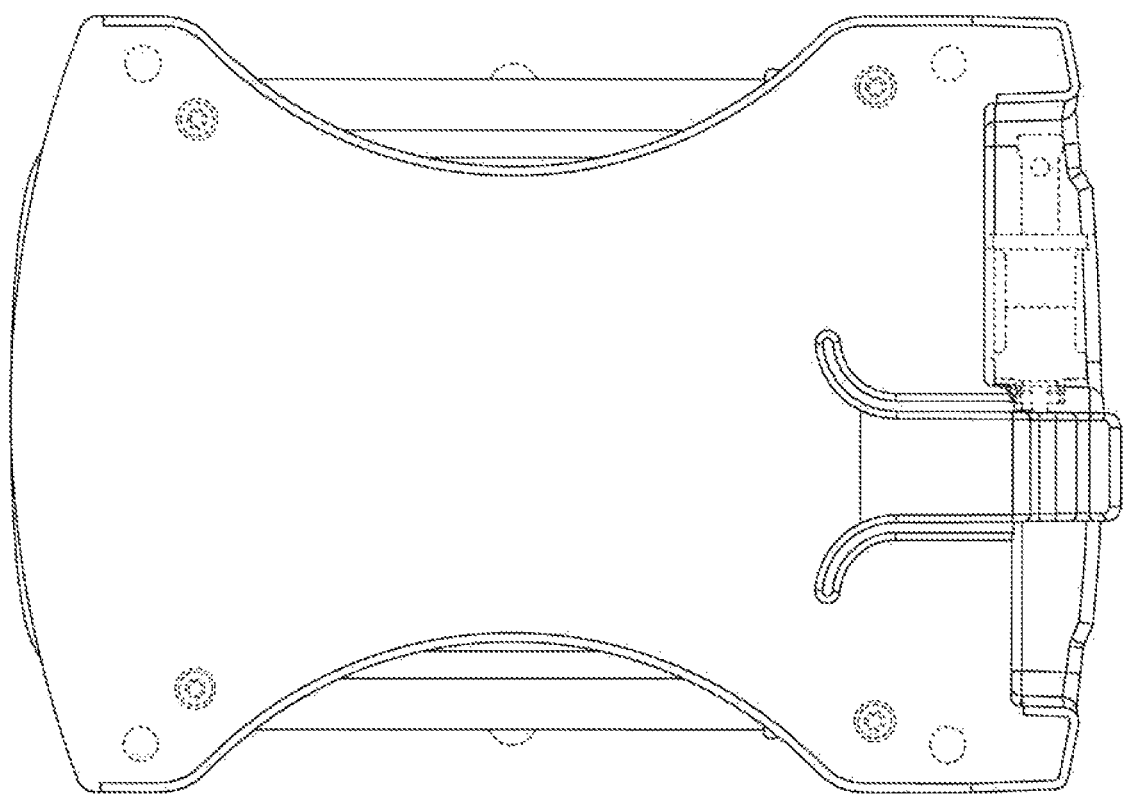
FIG. 7 is a bottom view of the stuffed waffle maker depicted in FIG. 1.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 8:
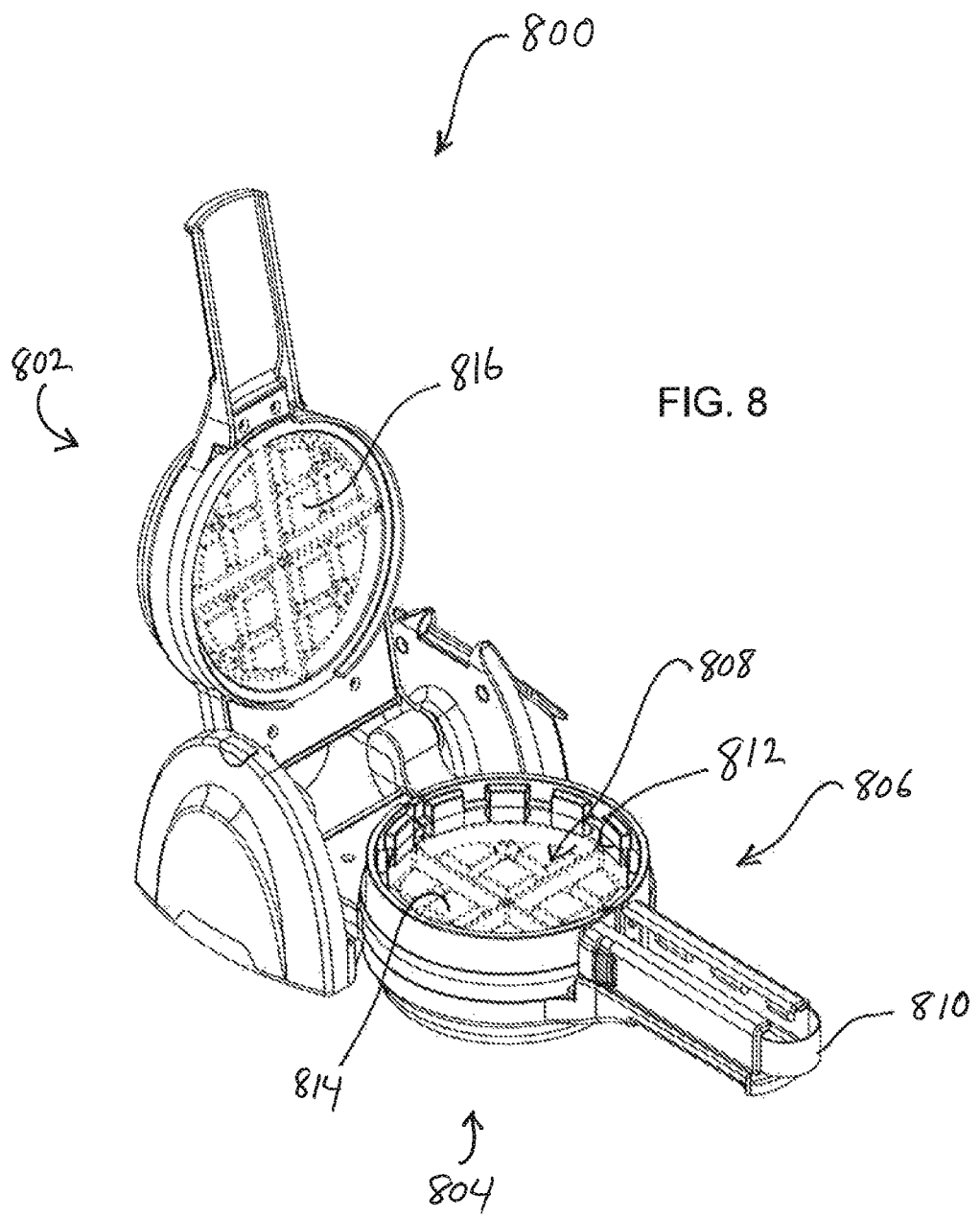
FIG. 8 is a front, right, perspective view of the stuffed waffle maker depicted in FIG. 1 in an open configuration.
Figure 9:
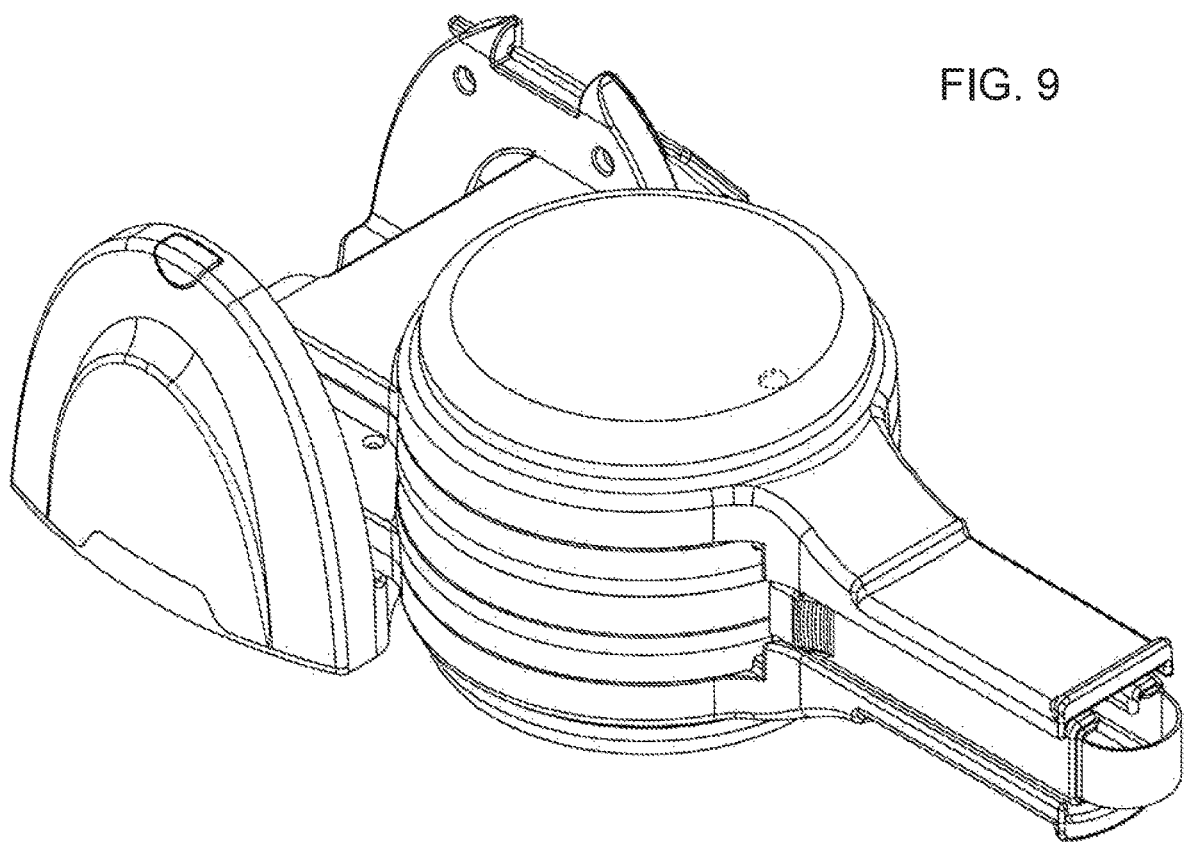
FIG. 9 is a front, right, perspective view of the stuffed waffle maker depicted in FIG. 1 in a first cooking configuration.
Figure 10:
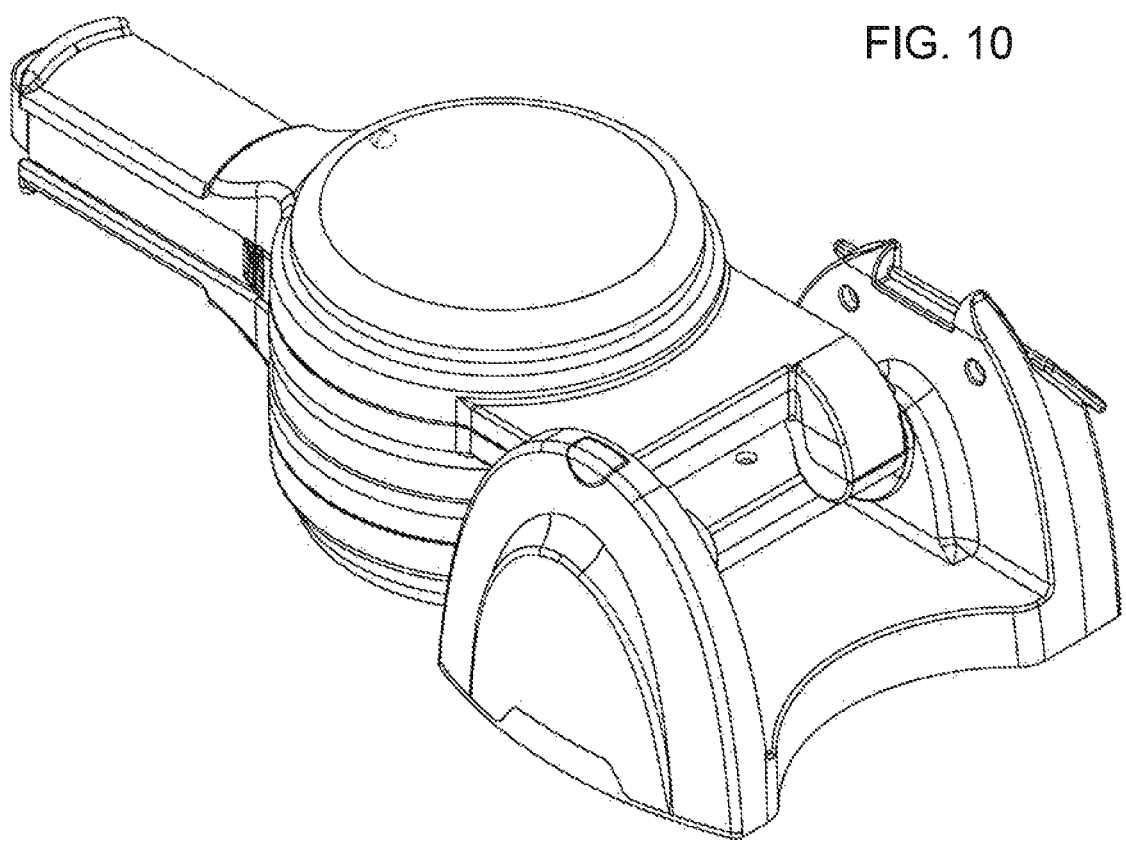
FIG. 10 is a front, right, perspective view of the stuffed waffle maker depicted in FIG. 1 in a second cooking configuration.

As illustrated in FIGS. 1-22, exemplary stuffed waffle makers are capable of various configurations. As illustrated in FIG. 8, a stuffed waffle maker 800 is configured to allow an upper portion 802 and a lower portion 804 to hingedly open as illustrated. When in an open configuration, a waffle tong assembly 806 according to an exemplary embodiment forms a space 808 for batter to be cooked between the upper portion 802 and lower portion 804. When ready for use, the upper portion 802 and lower portion 804 are heated and batter (not shown) is introduced to the space 808. When a desired amount of batter has been placed into the space 808, the upper portion 802 is caused to cover the space 808. The result is illustrated in FIG. 9. To allow for a more evenly cooked waffle, the upper portion 802, the lower portion 804 and the waffle tong assembly 806 are rotated from the position shown in FIG. 9 to that illustrated in FIG. 10. After a period of time necessary to cook the batter that had been previously introduced into the space 808, the upper portion 802 and lower portion 804 of the stuffed waffle maker 800 are opened as illustrated in FIG. 8. The batter previously introduced to the space having been cooked such that a cake-like waffle is produced.

Figure 11:
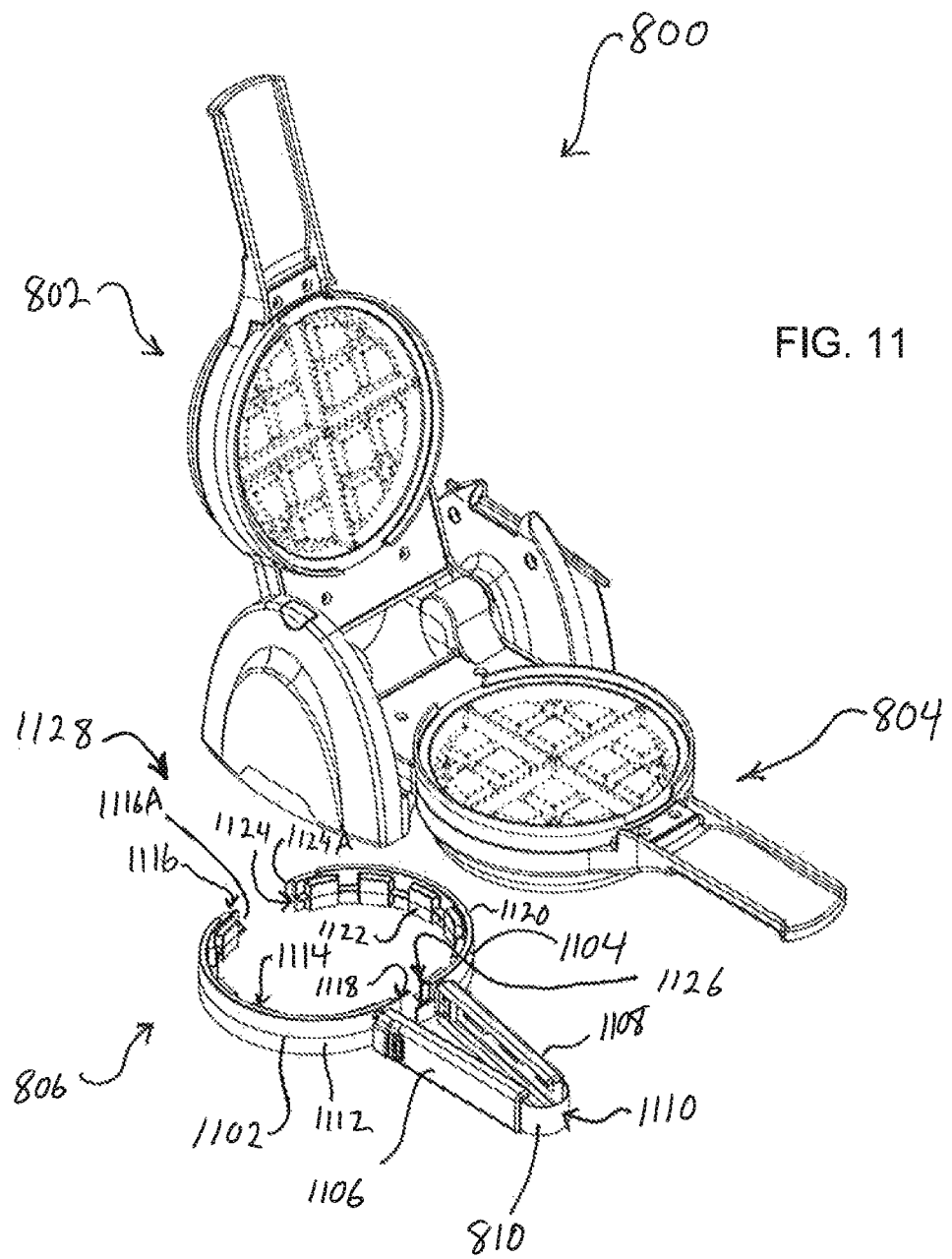
FIG. 11 is a front, right, exploded, perspective view of the stuffed waffle maker depicted in FIG. 1 in an open configuration wherein an exemplary embodiment of the waffle tongs is illustrated separately from the upper and lower portion of the stuffed waffle maker and shown in an open position.
Figure 12:
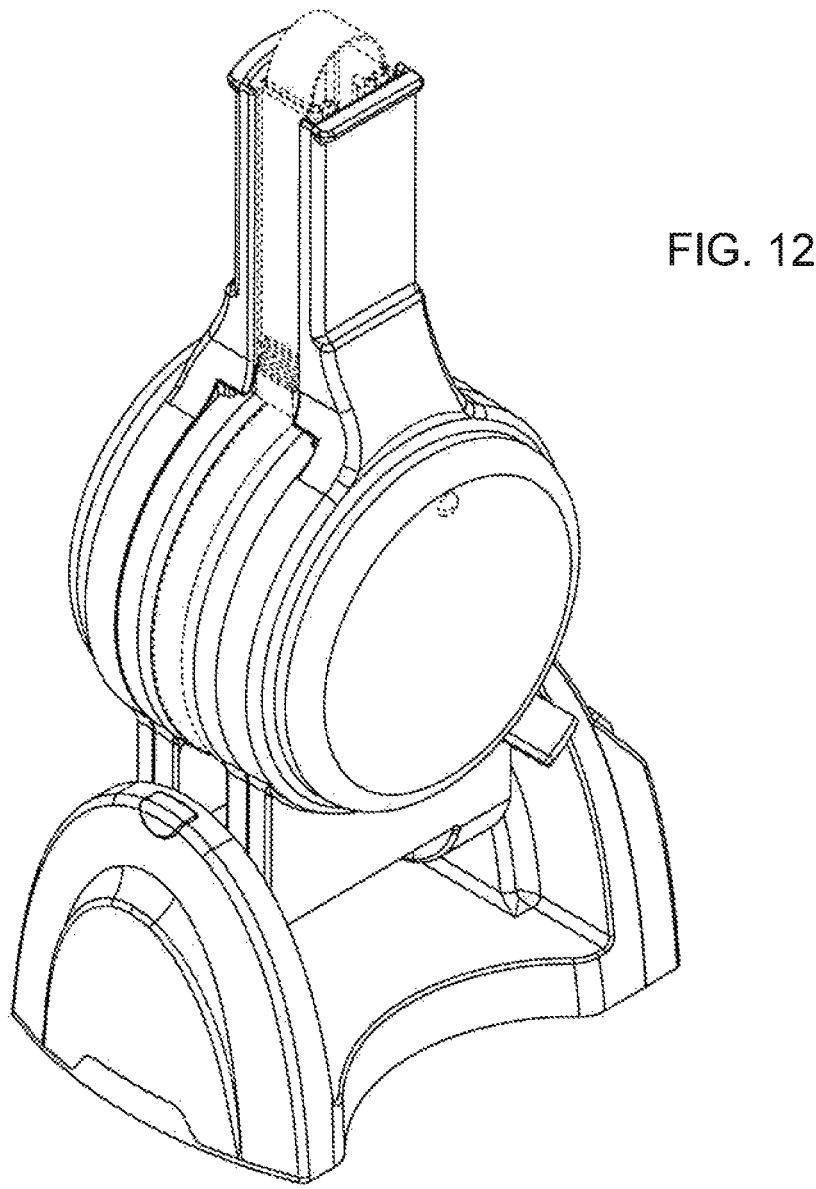
FIG. 12 is a front, right, perspective view of an alternate design of a stuffed waffle maker.
Figure 13:
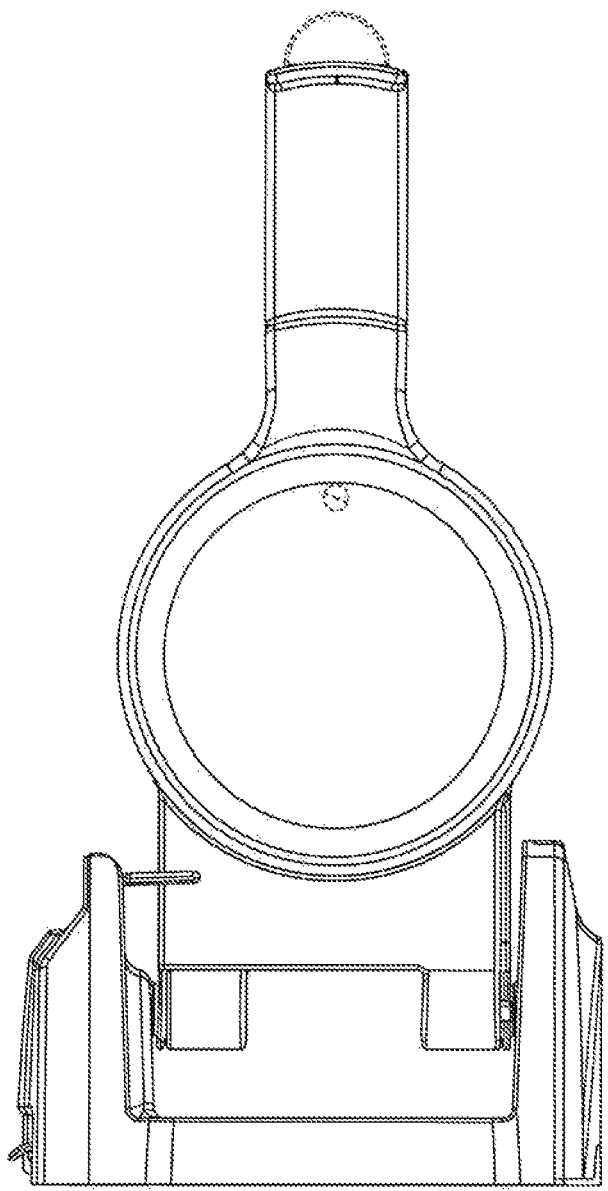
FIG. 13 is a left side view of the stuffed waffle maker depicted in FIG. 12.
Figure 14:
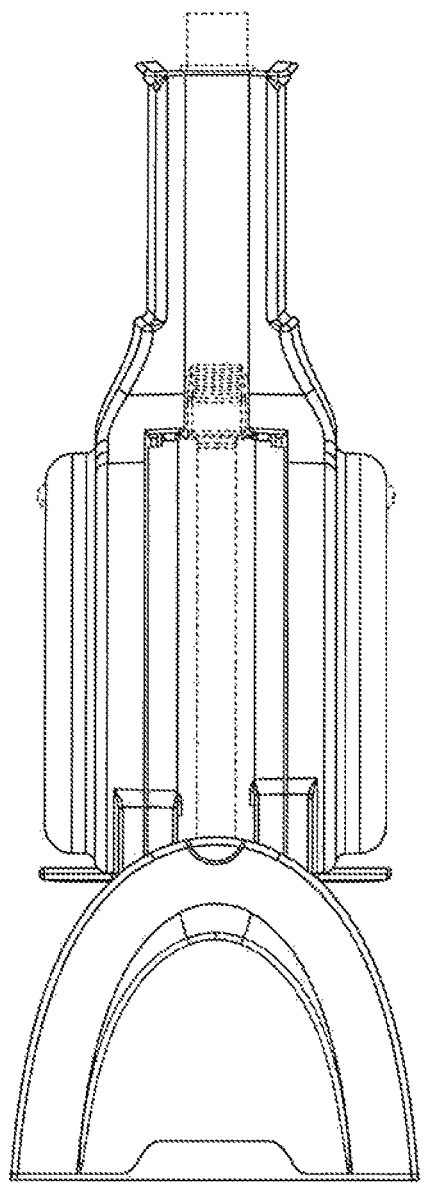
FIG. 14 is a front view of the stuffed waffle maker depicted in FIG. 12.
Figure 15:
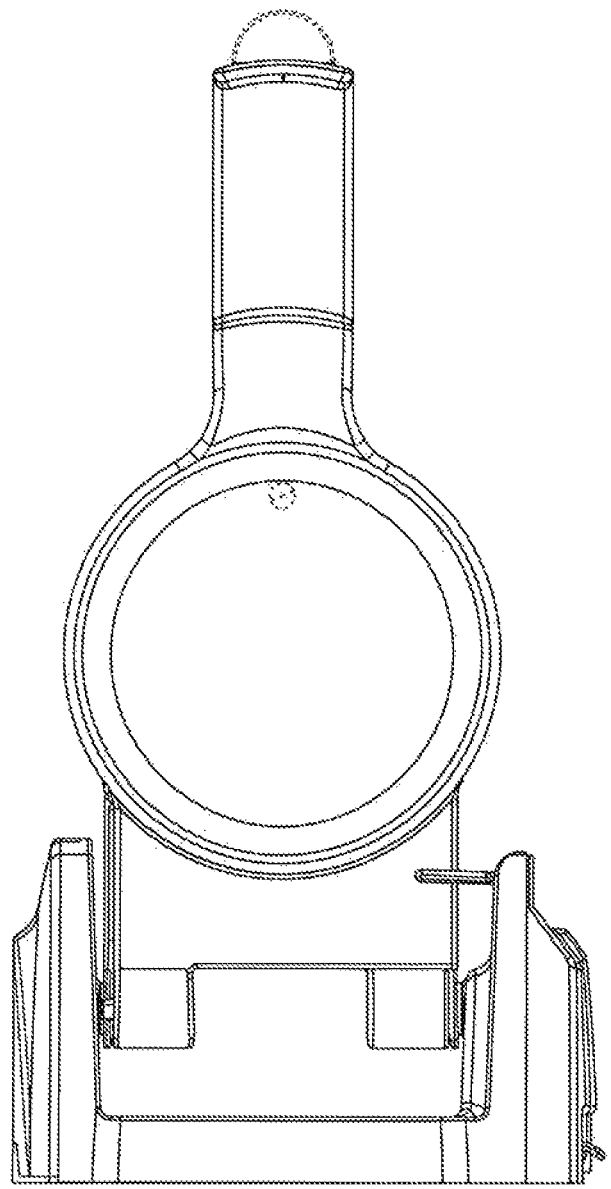
FIG. 15 is a right side view of the stuffed waffle maker depicted in FIG. 12.
Figure 16:
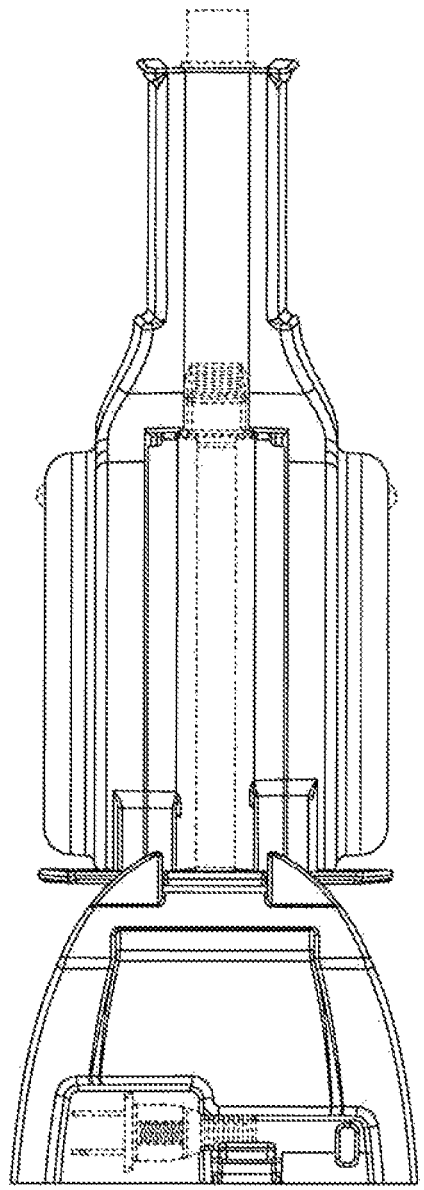
FIG. 16 is a rear view of the stuffed waffle maker depicted in FIG. 12.
Figure 17:
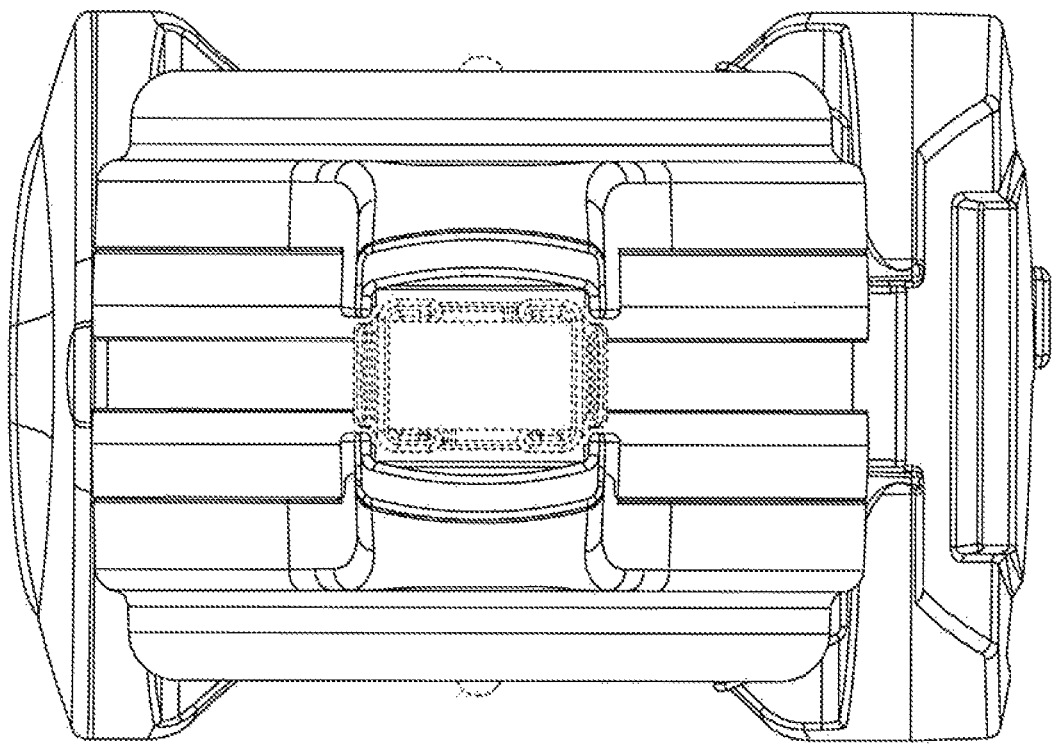
FIG. 17 is a top view of the stuffed waffle maker depicted in FIG. 12.
Figure 18:
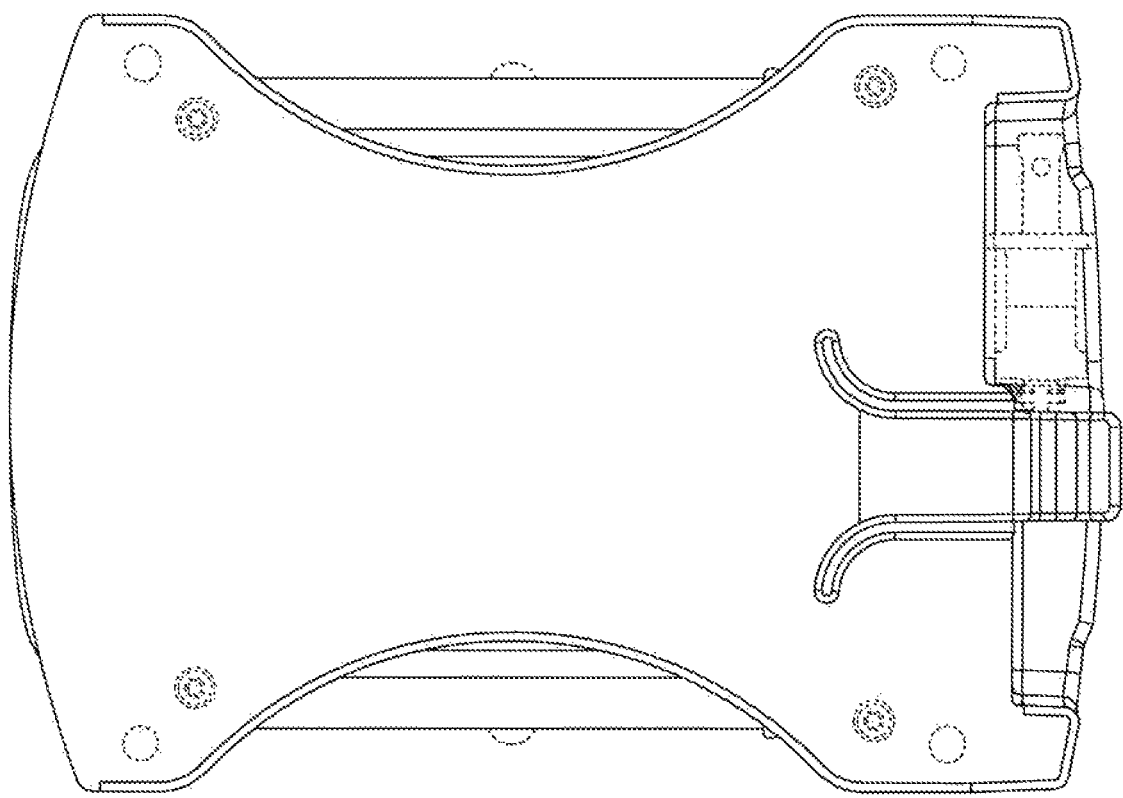
FIG. 18 is a bottom view of the stuffed waffle maker depicted in FIG. 12.
Figure 19:
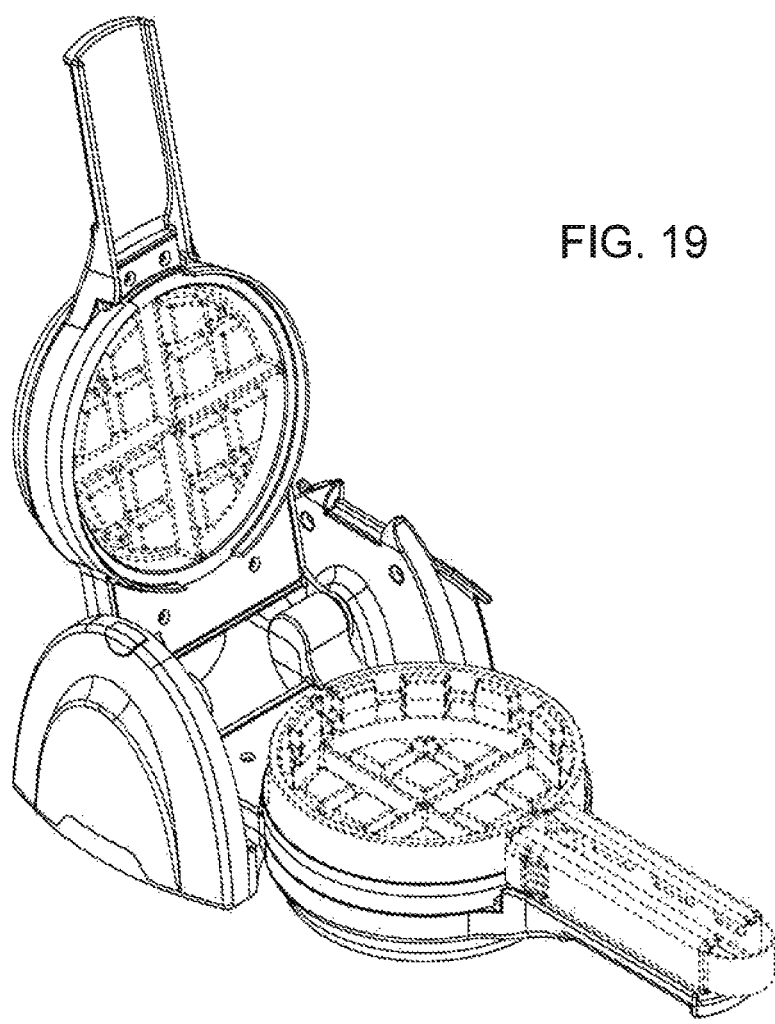
FIG. 19 is a front, right, perspective view of the stuffed waffle maker depicted in FIG. 12. in an open configuration wherein an exemplary embodiment of the waffle tongs is illustrated as in a closed position arranged on the lower portion of the waffle maker.
Figure 20:
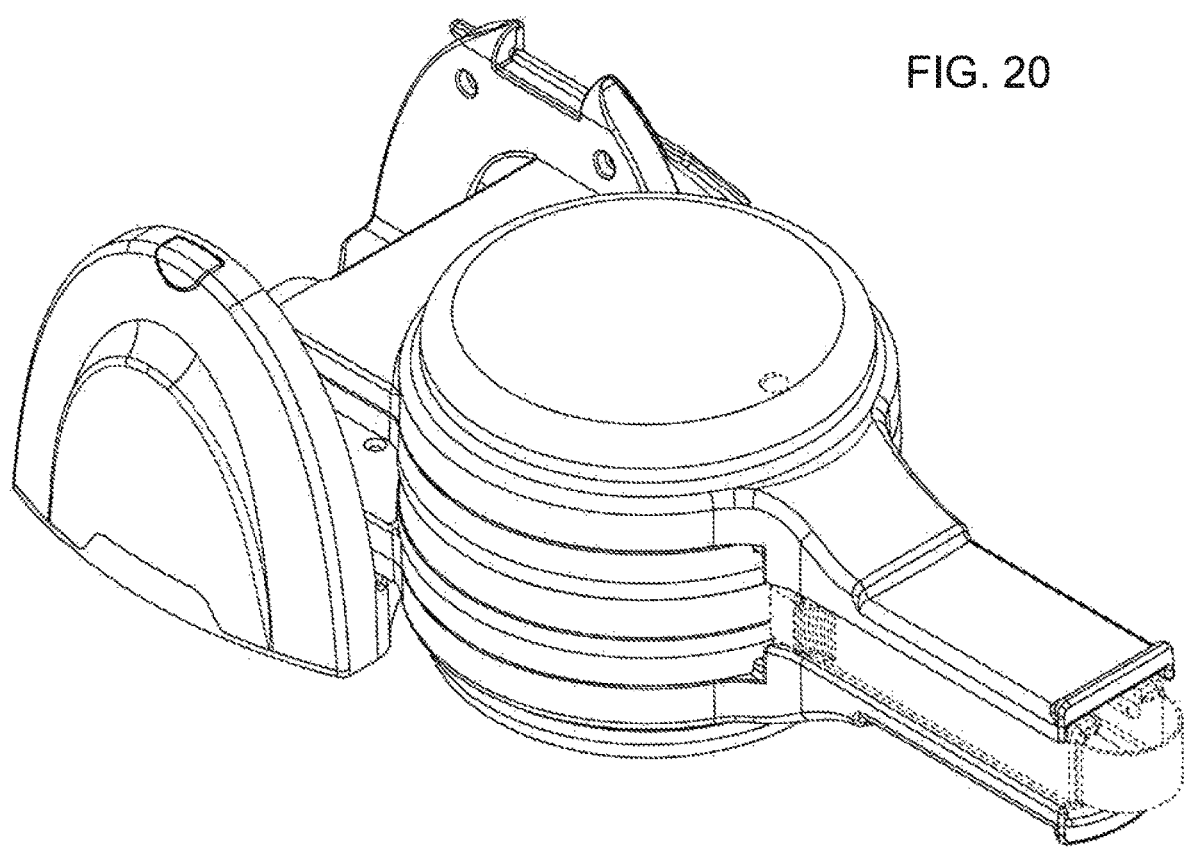
FIG. 20 is a front, right, perspective view of an alternate design of a stuffed waffle maker in a first cooking configuration.
Figure 21:
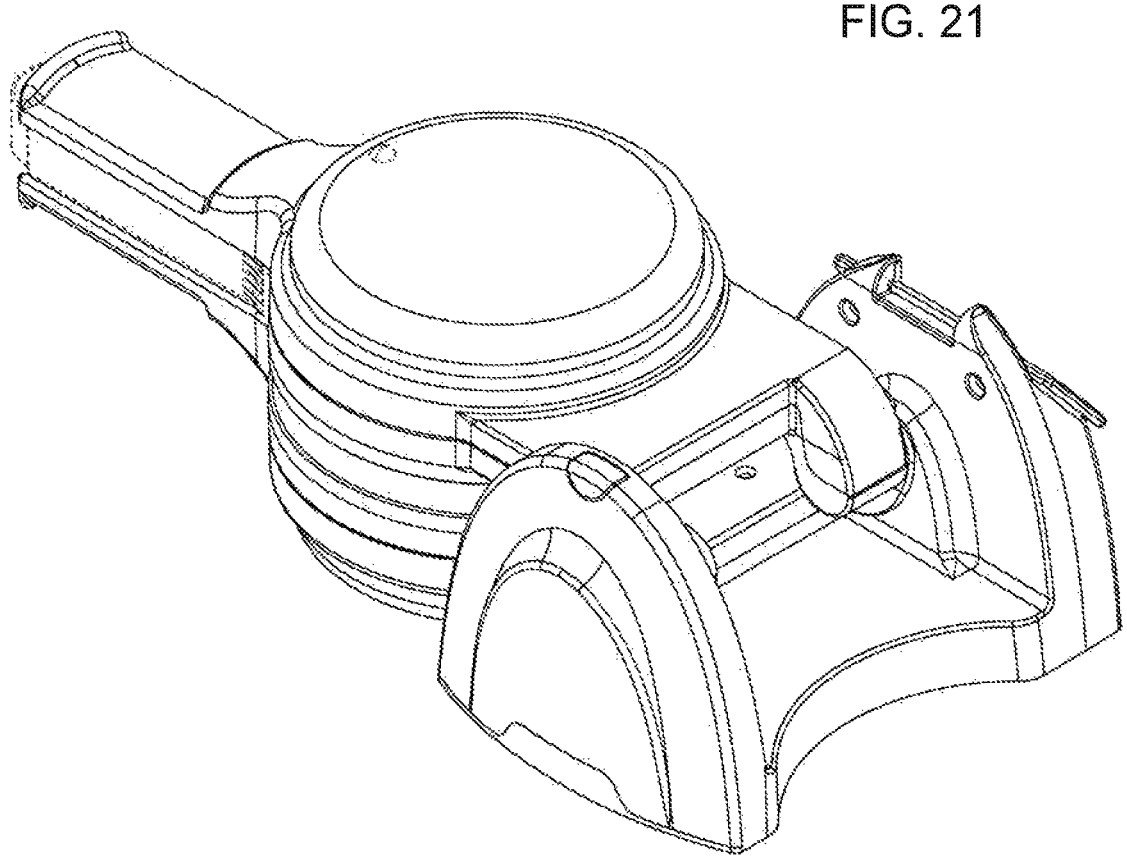
FIG. 21 is a front, right, perspective view of the stuffed waffle maker of FIG. 20 in a second cooking configuration.
Figure 22:
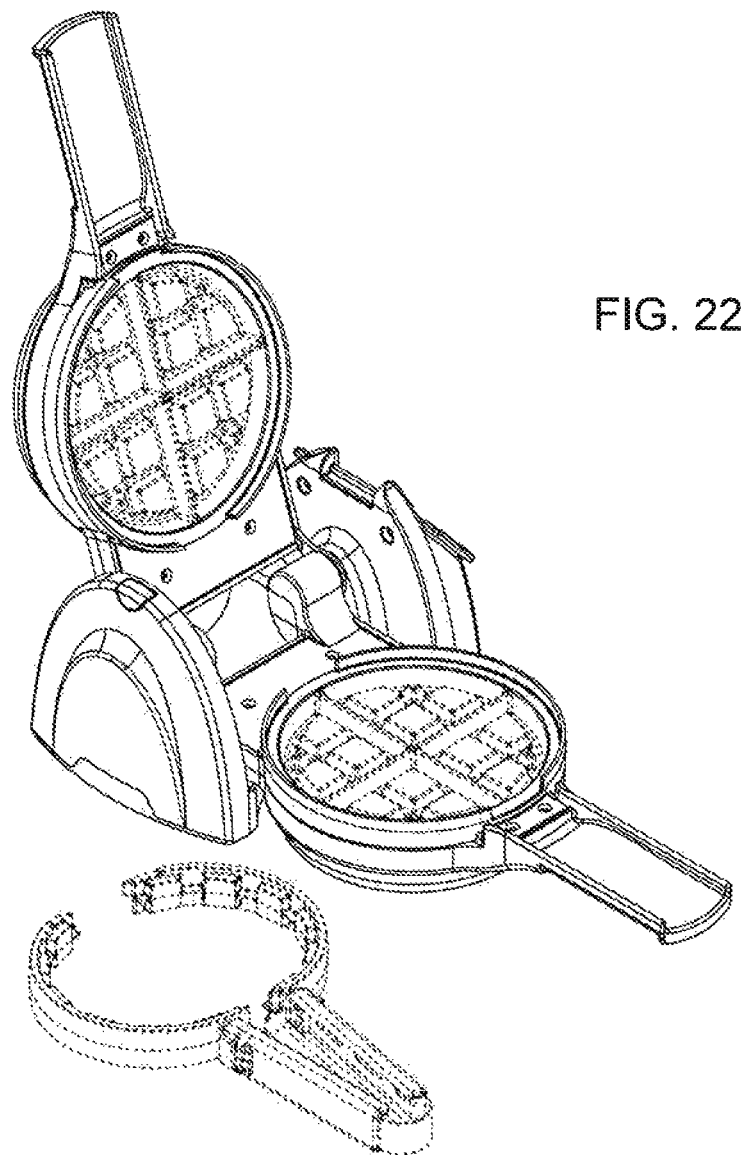
FIG. 22 is a front, right, exploded, perspective view of the stuffed waffle maker depicted in FIG. 20 in an open configuration.

To remove the waffle from the stuffed waffle maker 800, the waffle tong assembly 806 is removed from the lower portion 804 and opened to allow the waffle to be easily removed from waffle tong assembly 806. FIG. 11 illustrates an exemplary waffle tong assembly 806 in an open orientation. Referring still to FIG. 11, the waffle tong assembly 806 will be described in detail. According to the exemplary embodiment illustrated, the waffle tong assembly 806 comprises a first side portion 1102, a second side portion 1104, a first handle portion 1106, a second handle portion 1108, and a connecting portion 1110. The first side portion 1102 comprises an outer surface 1112, an inner surface 1114, an outer end 1116, and an inner end 1118. The second side portion 1104 also comprises an outer surface 1120, an inner surface 1122, an outer end 1124, and an inner end 1126. In an exemplary embodiment, the connecting portion 1110 is connected adjacent to the inner end 1118 of the first side portion 1102 and extends through the first handle portion 1106, the second handle portion 1108, and is connected adjacent to the inner end 1126 of the second side portion 1104.

As is apparent when comparing the arrangement of the exemplary embodiment of a waffle tong assembly 806 illustrated in FIG. 8 with the arrangement illustrated in FIG. 11, the connecting portion 1110 is flexible at its midpoint 810. As is further apparent, the connecting portion 1110 is biased such that unless constrained, the first side portion 1102 and the second side portion 1104 are held in a separated orientation 1128 illustrated in FIG. 11. As is shown in FIG. 8, the lower portion 804 constrains the waffle tong assembly 806 in a closed arrangement such that the outer ends (1116 and 1124) are held in contact with each other and the inner ends (1118 and 1126) are similarly held in contact. This arrangement prevents batter introduced into a space 808 formed by the waffle tong assembly 806 and the lower portion 804 from leaking out of the space. The bias of the connecting portion 1110 causes the first side portion 1102 and second side portion 1104 to separate as illustrate in FIG. 11 allowing a user to remove a cooked waffle from the waffle tong assembly 806 and the lower portion 804.

As one of ordinary skill in the art will understand, in order to convert uncooked batter into a cakelike waffle, the batter must be heated. As was previously described, the upper portion 802 and lower portion 804 of the stuffed waffle maker 800 are heated. Heat from the upper portion 802 and lower portion 804 is transferred to the side portions (1102 and 1104) which in certain exemplary embodiments, can cause the connecting portion 1110 to also become hot. In order to prevent a user from being exposed to this heat, an exemplary embodiment is configured with a first handle portion 1106 and a second handle portion 1108 are arranged such that a user can grip the waffle tong assembly 806 without directly contacting the first side portion 1102, the second side portion 1104, or the connecting portion 1110. In certain exemplary embodiments, the first handle portion 1106 and second handle portion 1108 are configured with raised portions located at the portion of the first handle portion 1106 adjacent to the first side portion 1102 and the second handle portion 1108 adjacent to the second side portion 1104.

Referring to FIG. 11, in certain exemplary embodiments, the outer ends (1116 and 1124) of the first side portion 1102 and second side portion 1104 comprise alignment tabs 1116A and 1124A which interlock to further align the outer ends (1116 and 1124) when the waffle tong assembly 806 is in the closed arrangement illustrated in FIG. 8. The inner ends (1118 and 1126) are likewise configured as visible in FIG. 11.

Referring again to FIG. 8, certain exemplary embodiments of the waffle tong assembly 806 may be formed with raised shapes 812 locate on the inner surface 1114 of the first side portion 1102 and the inner surface 1122 of the second side portion 1104. While in certain exemplary embodiments, these raised shapes 812 may be formed such that they result in a decorative appearance in the sides of a cooked stuffed waffle, these shapes also serve to prevent the cooked stuffed waffle from sliding out of the first side portion 1102 and the second side portion 1104 when the waffle tong assembly 806 is removed from the upper portion 802 or lower portion 804. In certain exemplary embodiments, these raised shapes 812 are shaped to be similar to cooking surfaces 814 and 816 found in the upper portion 802 and lower portion 804 of the stuffed waffle maker 800. The raised shapes 812, 814, and 816 are not limited to those illustrated in the FIGS. referenced in this description.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

Any implementation or embodiment disclosed herein can be combined with any other implementation or embodiment, and references to "an implementation," "some implementations," "one implementation," "an embodiment," "some embodiments," "certain embodiments," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation or embodiment can be combined with any other implementation or embodiment, inclusively or exclusively, in any manner consistent with the aspects and implementations disclosed herein.

Where technical features in the drawings, detailed description or any claim are followed by reference numbers, the reference numbers have been included to increase the intelligibility of the drawings, detailed description, and claims. Accordingly, neither the reference numbers nor their absence have any limiting effect on the scope of any claim elements.

Coupled elements can be electrically, magnetically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the Figures. The orientation of various elements may differ according to other exemplary embodiments, and that such variations are intended to be encompassed by the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

What is claimed is:

1. A waffle tong device for use with a stuffed waffle maker having an upper portion and a lower portion, the waffle tong device comprising:
   a first side portion having an outer end and an inner end;
   a second side portion having an outer end and an inner end; and
   a connecting portion having a first end connected to the inner end of the first side portion and a second end connected to the inner end of the second side portion, the connecting portion having a bias which causes the first side portion to separate from the second side portion.

2. The waffle tong device of claim 1, wherein the connection portion is a continuous structure from the first end to the second end.

3. The waffle tong device of claim 1, wherein the connecting portion has a spring bias such that the first side portion and the second side portion are held apart from each other when no compressive force is applied to the waffle tong device.

4. The waffle tong device of claim 1, further comprising a first handle portion and a second handle portion, each handle portion is mounted to the connecting portion to form a gripping surface for applying compressive force.

5. The waffle tong device of claim 4, wherein the first handle portion and the second handle portion are formed from a material that provides a heat insulative function between the connecting portion and an outer surface of the first handle portion and the second handle portion.

6. The waffle tong device of claim 1, wherein:
the outer end of the first side portion is configured with a first portion alignment tab;
the outer end of the second side portion is configured with a second portion alignment tab; and
the first portion alignment tab and the second portion alignment tab are configured such that the first side portion and the second side portion are aligned when caused to be in contact with each other by the connecting portion.

7. The waffle tong device of claim 1, wherein the first side portion has an outer surface and an inner surface and the second side portion has an outer surface and an inner surface, the inner surface of the first side portion and the inner surface of the second side portion being configured with raised shapes spaced about the inner surface of the first side portion and the inner surface of the second side portion.

8. The waffle tong device of claim 1, wherein the first side portion and the second side portion are adapted to mount between the upper portion and the lower portion of the stuffed waffle maker.

9. The waffle tong device of claim 1, wherein the first side portion and the second side portion are formed in an arcuate shape.

10. A waffle tong device for use with a stuffed waffle maker having an upper portion and a lower portion, the waffle tong device comprising:
a first side portion having an outer end and an inner end, the outer end of the first side portion being configured with a first portion alignment tab, the first side portion having an outer surface and an inner surface;
a second side portion having an outer end and an inner end, the outer end of the second side portion being configured with a second portion alignment tab, the second side portion having an outer surface and an inner surface;
the inner surfaces of the first and second side portions being configured with raised shapes spaced about the inner surfaces; and
a connecting portion having a first end connected to the inner end of the first side portion and a second end connected to the inner end of the second side portion, the connecting portion being continuous from the first end to the second end, the connecting portion having a bias such that the first side portion and the second side portion are held apart from each other when no compressive force is applied to the waffle tong device;
a first handle portion and a second handle portion, each handle portion being mounted to the connecting portion to form gripping surfaces for applying compressive force, the first handle portion and the second handle portion being formed from a material that provides a heat insulative function between the connecting portion and an outer surface of the first handle portion and the second handle portion;
the first portion alignment tab and the second portion alignment tab are configured such that the first side portion and the second side portion are aligned when caused to be in contact with each other by the connecting portion;
the first side portion and the second side portion are adapted to mount between the upper portion and the lower portion of the stuffed waffle maker; and
the first side portion and the second side portion being formed in an arcuate shape.

\* \* \* \* \*